Figure 4:
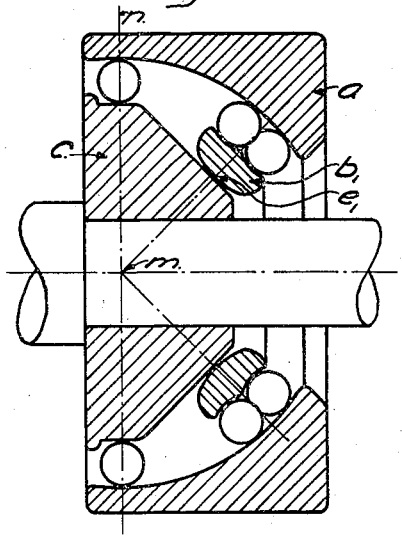

K. J. LJUNGBERG.
BALL BEARING.
APPLICATION FILED MAY 20, 1915.
1,234,779.
Patented July 31, 1917.
4 SHEETS—SHEET 1.
Fig. 1.a.
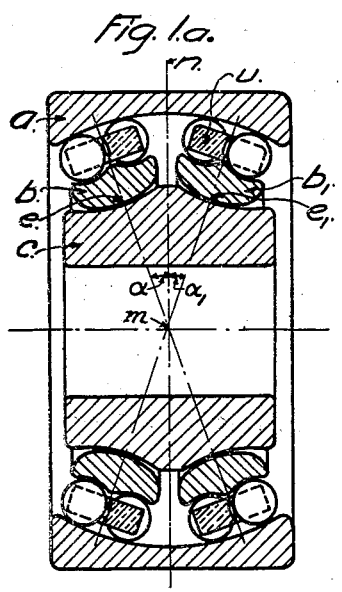
Fig. 1.b.
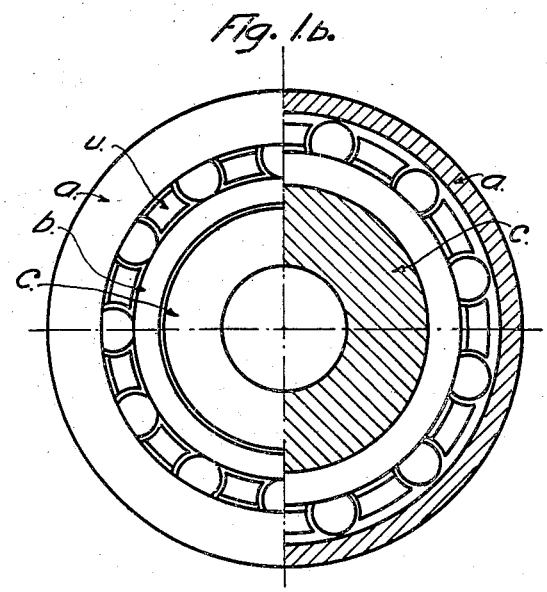
Fig. 2.
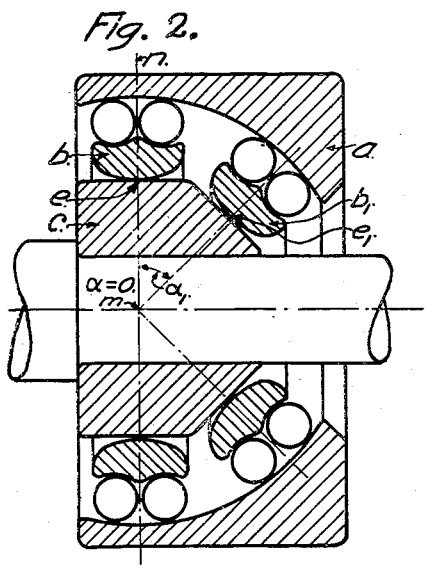
Fig. 3.
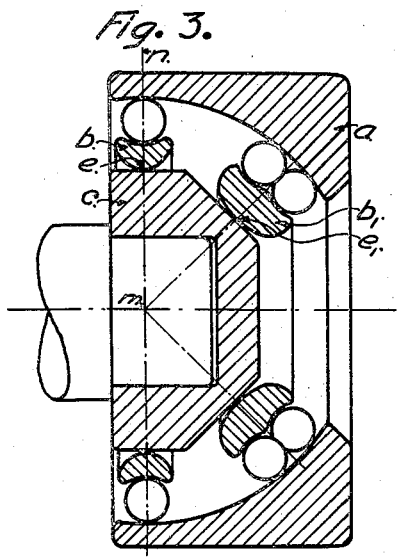
Inventor:
Karl J. Ljungberg
By Attys.
Fraser, Turk & Myers

K. J. LJUNGBERG.
BALL BEARING.
APPLICATION FILED MAY 20, 1915.

1,234,779.

Patented July 31, 1917.
4 SHEETS—SHEET 2.

Inventor:
Karl J. Ljungberg,
By Attys
Fraser, Turk & Myers

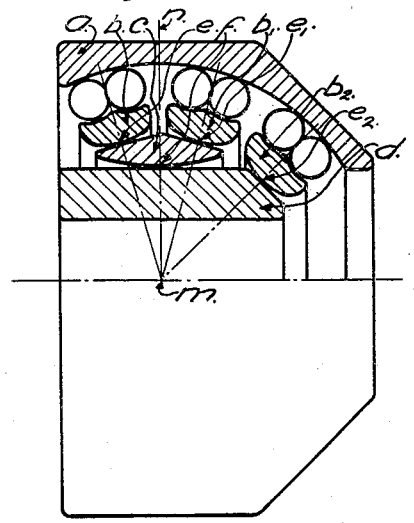
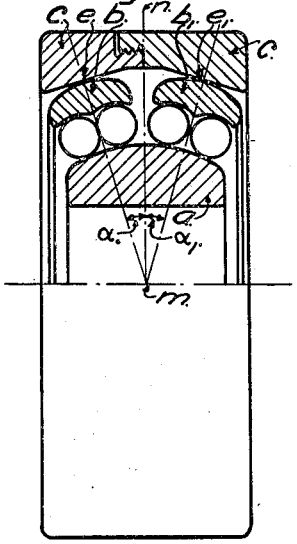
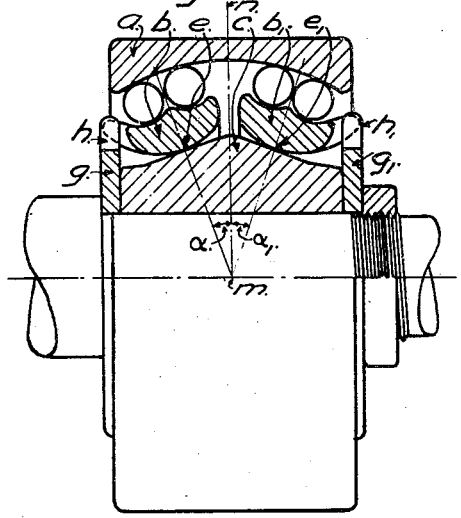
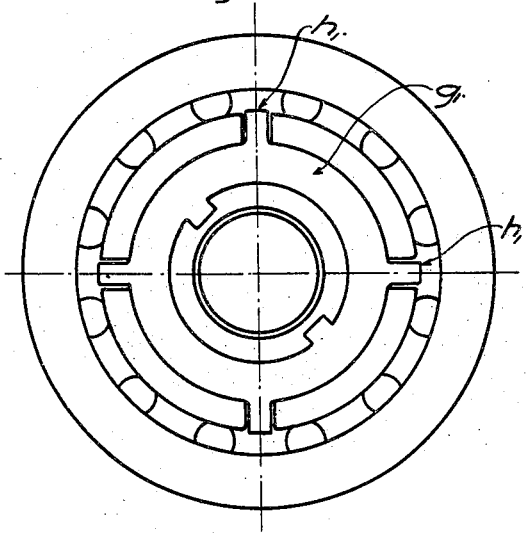

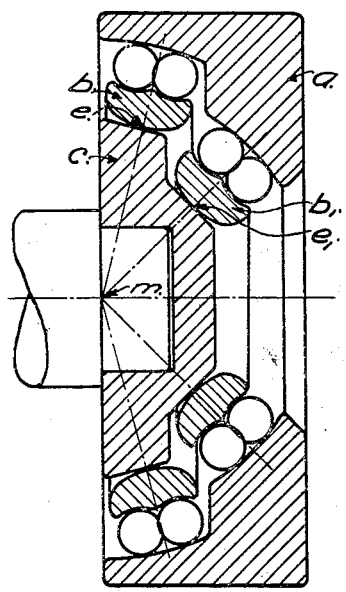
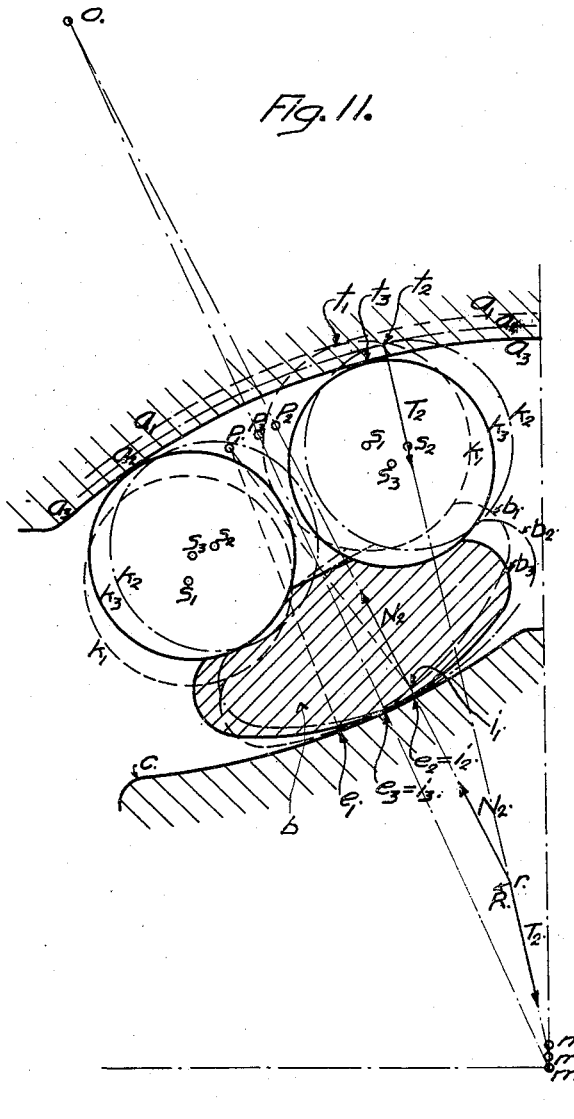
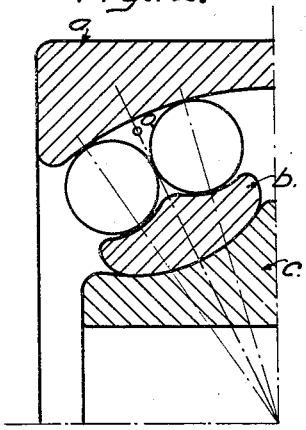

UNITED STATES PATENT OFFICE.

KARL J. LJUNGBERG, OF STOCKHOLM, SWEDEN.

BALL-BEARING.

1,234,779.  Specification of Letters Patent.  Patented July 31, 1917.

Application filed May 20, 1915. Serial No. 29,307.

*To all whom it may concern:*

Be it known that I, KARL J. LJUNGBERG, a citizen of the Kingdom of Sweden, residing at Stockholm, Sweden, have invented new and useful Improvements in Ball-Bearings, of which the following is a specification.

This invention relates to ball bearings and more specifically to ball bearings having a spherical race on one of the bearing rings and more than two sets of balls.

In ball bearings as well as in bearings of other types it is of importance that the bearing be capable of adjusting itself to the bent or inclined positions which the shaft may occupy on account of the load or from other reasons. This object may for instance be attained in ball bearings by forming the inner or the outer ball race for all the balls as a spherical surface having its center on the axis of the bearing. In ball bearings of all kinds it is further of importance that the pressure on the bearing be distributed on as many sets of balls as possible, in order that, on the one hand, the size of the bearing—especially in radial direction—may be reduced as far as possible and, on the other hand, that the bearing may be able to sustain end thrusts in various directions. In ball bearings hitherto used having an outer or inner race member stationary or acting as a stationary member, the distribution of the load on the different sets of balls, if more than two in number, is statically indefinite or depending, on the one hand, on the resiliency or the deformation of the race members and the balls and, on the other hand, on the more or less exact manufacture of the different parts of the bearing or on the greater or lesser wear of said parts. Owing thereto, it may happen that, even if several sets of balls are disposed in the bearing, one of them only has to sustain the whole load of the bearing, and, on account thereof, excessive stress or breakage of the balls of said set may easily occur.

The object of the invention is to effect in ball bearings having more than two sets of balls, a calculable distribution of the load on the different sets of balls and to attain this result without the inconveniences connected therewith in other constructions hitherto known.

With this object in view the invention consists, chiefly, in providing in a ball bearing having more than two ball sets a bearing member having spherical races for said ball sets struck from a common center on the axis of rotation, and another bearing member comprising at least two race members adjustable in relation to each other and each carrying at most two ball sets.

Other advantages of my invention will be more definitely set forth hereinafter in connection with the detailed description of the accompanying drawings which illustrate several embodiments of my invention, and in which—

Figure 5:
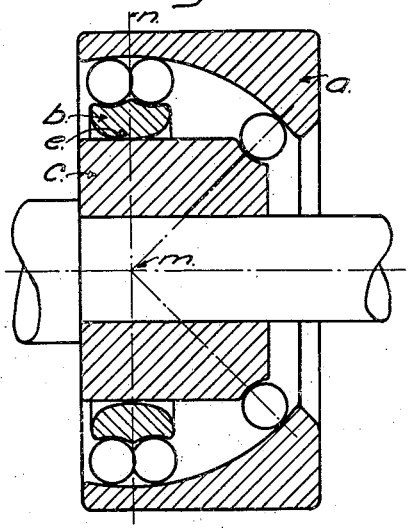
Figure 6:
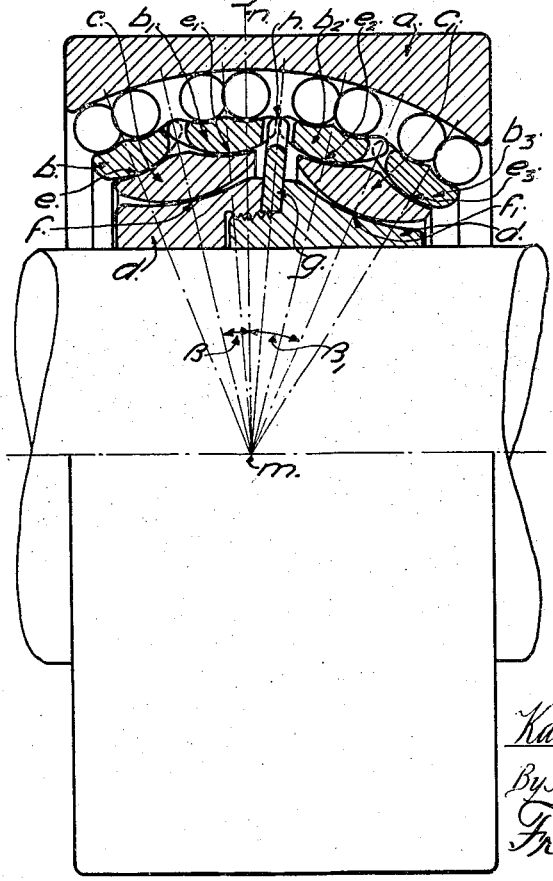

Figure 1$^a$ is a sectional view of a ball bearing having a spherical outer ball race and four sets of balls; Fig. 1$^b$ is an end elevation and partly a section of the bearing represented in Fig. 1$^a$; Fig. 2 is a sectional view of another ball bearing having a spherical outer ball race and four sets of balls; Fig. 3 is a sectional view of a similar bearing having three sets of balls; Figs. 4 and 5 are modified forms of the bearings shown in Figs. 2 and 3; Fig. 6 is a side view, partially in section, of a bearing having eight sets of balls; Fig. 7 is a side view, partially in section, of a bearing having six sets of balls; Fig. 8 is a side view, partially in section, of a bearing having an inner spherical ball race; Fig. 9$^a$ is a side view, partially in section, of a ball bearing having an outer spherical ball race and devices locking the race members to the supporting rings; Fig. 9$^b$ is an end view of the bearing represented in Fig. 9$^a$; Fig. 10 is a sectional view of a bearing having outer spherical races struck with unequal radii from a common center on the axis of the bearing; Figs. 11 and 12 illustrate diagrammatically on an enlarged scale different motions of certain parts of the bearing.

Referring first to Figs. 1$^a$ and 1$^b$, the outer races of the four sets of balls constitute a concave spherical surface formed in the bearing ring $a$ and having its center $m$ on the axis of rotation. The inner races of the balls are located on two race rings $b$ and $b_1$, each having two concave ball races, said race rings being supported by a ring $c$. By forming suitably the inner side of the ring $b$ and the corresponding portion of the outer side of the ring $c$, the contact between said rings may be limited to a point $e$ or to a comparatively small surface about said point. If one of the ball sets only of the ring $b$ should initially bear against the outer ball race, the race ring $b$ will under the influence of a load on the bearing turn a small angle about the point $e$, until both ball sets bear against the outer race ring, provided that a certain play exists between the race ring $b$ and the supporting ring $c$ or arises at the compression of the balls and the rings. If the point $e$ is located on a radius of the spherical race just between both ball sets, and if the rings $b$ and $c$ are so formed at the point $e$, that the contact takes place on a small surface at right angles to the said radius the pressure on both ball sets will be equal, apart from small changes caused by the friction and the unequal compression of the balls or the changes of the direction of pressure caused by the centrifugal force of the balls and the race ring. By choosing the position of the point $e$ variously and, besides, by varying the inclination of the tangents of the sectional curves of the race ring at the said point, one will be able to adjust for the action of the centrifugal force and, if necessary, to distribute the pressure on both ball sets. In this constructional form the ring $b_1$ is formed quite as the ring $b$. If the pressure on the shaft is directed at right angles to the same along the line $m$—$n$ and if the angles $\alpha$ and $\alpha_1$ between this line and the lines $m$—$e$ and $m$—$e_1$ are equal, it will be understood, that the loads on both race rings $b$ and $b_1$ will be equal and, consequently, the loads on all the four ball sets will be equal or substantially equal. If the load on the shaft be directed otherwise than along the line $m$—$n$, the pressures on the different ball sets will not be equal but it will, notwithstanding, be possible to define the distribution of the load on the said ball sets.

Should the bearing be intended for sustaining a load which is not directed at right angles to the axis of the bearing, one may, by choosing other values for the angles $\alpha$ and $\alpha_1$ obtain equal or approximately equal pressures on the different ball sets. A constructional form of this kind is shown in Fig. 2. In this case $\alpha=0$ and $\alpha_1=45°$; other values of the angles may, of course, be chosen. The load on the shaft shall obviously be directed just between the lines $m$—$e$ and $m$—$e_1$, if the different ball sets should have to sustain approximately equal pressures.

Fig. 3 illustrates a modified form of the bearing shown in Fig. 2 comprising three ball sets only. If the shaft, as a rule, be exposed substantially to end thrusts and exceptionally to radial thrusts, or if the end thrusts be greater than the radial thrusts, it will suffice to provide a single ball set on the ring $b$, but two ball sets on the ring $b_1$. In such case the extension of the radius $m$—$e$ ought to pass through the centers of the balls on the ring $b$, as is shown in Fig. 3. The supporting member $c$ need not in this bearing nor in other cases be formed as a ring, but may, as is evident from the figure, be formed otherwise, only it is limited by a surface of revolution, on which the contact points $e$ and $e_1$ are located.

The bearing shown in Fig. 3 may be simplified by omitting the race ring $b_1$ as is shown in Fig. 4, the corresponding ball set thus tracking directly on the ring $c$, which, consequently, serves as a race ring for the said ball set and as a supporting ring for the race ring $b_1$. The race of the ring $c$ may not in this case be formed as a groove, but is to be so formed, that the ring $c$ may be moved some distance axially without causing oblique pressures on the balls.

Another modified form is illustrated in Fig. 5 in which the race ring $b_1$ is omitted. This bearing is especially suited to shafts, the pressure of which most frequently or to a great extent is directed at right angles to the shaft.

In all the constructional forms described above the member or ring $c$ supporting the race rings is directly supported by or secured to the shaft. If the number of ball sets is greater than is shown in the figures mentioned above, it will be necessary to provide still another supporting ring. A bearing of this kind having eight ball sets is shown in Fig. 6. In this case the outer races of all the ball sets constitute a spherical surface on the race ring $a$, while the inner races are distributed on four rings $b$, $b_1$, $b_2$, $b_3$, each of which is formed with two grooved ball races. Said race rings are at the points $e$, $e_1$, $e_2$, $e_3$ supported by two rings $c$ and $c_1$ which in turn are supported at the points $f$ and $f_1$ by the ring $d$. It will appear from the construction shown in Fig. 6 and the description of Fig. 1$^a$ that, if the angles $\beta$ and $\beta_1$ are equal and the pressure on the shaft is directed at right angles thereto along the line $m$—$n$ the pressure on all the eight ball sets will, practically taken, be equal, but may also be varied at will or adjusted according to another direction of pressure by choosing other values on the angles $\beta$ and $\beta_1$ and by changing the positions of the points $e$ and $f$ as well as the magnitude of the angles of inclination of the ring sections in the said points.

A constructional form having six ball sets is shown in Fig. 7. In this case the race ring $b_2$ is supported directly by the supporting ring $d$. This bearing could also be constructed with five ball sets, if for instance the race ring $b_2$ be modified so as to carry one ball set only. In such case the ring $b_2$ could be omitted, so that the corresponding ball set would track directly on the supporting ring $d$ as in Fig. 5.

In all the constructional forms described above the outer races of the ball sets have a spherical form. Nothing prevents, however, from forming the inner races of all the ball sets as a convex, spherical surface, while the construction in other respects is realized according to the principles set forth in the foregoing description. In Fig. 8 is illustrated a constructional form of such a bearing having four ball sets. The inner races of the ball sets are formed by a convex, spherical surface on the ring $a$. The outer races are located on two rings $b$ and $b_1$ supported at the points $e$ and $e_1$ by the ring $c$. The conditions of the distribution of the pressure on the different ball sets are the same, as has been set forth above with reference to bearings having a spherical outer ball race. It will be easily understood, that corresponding variations of the construction, as are described above in connection with bearings having a spherical outer ball race, may also be effected in bearings having a spherical, inner ball race.

In the constructional forms described above all spherical ball races form part of the same spherical surface, i. e. are struck with equal radii from a common center. Nothing prevents, however, from using spherical ball races of unequal radii, provided that said surfaces are struck from a common center $m$, as is shown in Fig. 10.

In ball bearings constructed according to the principles set forth above each of the different rings may be integral or divided according to the use of the bearing. The rings however, constituting ball races are, preferably, made integral, since it is of importance for the durability of the bearing that the balls never pass a joint. Concerning a ring having a spherical outer or inner ball race the circumstance accedes, that it is difficult to produce an exact spherical surface, if the ring is to be composed of two or more portions. Preferably, the supporting rings $c$ and $d$ are also made integral; as to these rings, however, said condition is not as important as concerning the race rings, because no rotation about the shaft of the race rings in relation to the supporting rings should take place.

Bearings of the types shown in Figs. 1ª to 5, 7, 9ª and 9ᵇ and having all the rings made integral can be easily assembled by swinging the inner members in relation to the outer members along the spherical surface. The condition is only that the outer ring $a$ be provided with at least one opening of such size that the rings $b$—without the balls—may be introduced through said opening. The bearing illustrated in Fig. 8 cannot be assembled, if all the rings are made integral and of constant cross-section. In this case, however, the supporting ring $c$ only need be divided, as shown in the drawing, which, as is set forth above, is of less importance. For certain values of the angles $\alpha$ and $\alpha_1$ bearings of this type also can be assembled, even if all the rings are made integral.

In all the constructional forms described above the balls are, preferably, retained at their places by means of ball cages of any well-known or suitable construction, as shown in Figs. 1ª and 1ᵇ.

The principles of ball bearings require, that the friction between the balls and the rings forming outer and inner tracks be smaller than sliding friction, and on account thereof no sliding movement between a race ring $b$ and a supporting ring $c$ or between two supporting rings $c$ and $d$ is, as a rule, allowed to take place. It can, however, be conceived that under certain circumstances the resistance between the balls and the outer and inner ball races can increase to such an extent, that sliding motion between a race ring and a supporting ring takes place. Such movement may, however, be obviated by means of a simple locking device, for instance of the kind illustrated in Figs. 6, 9ª and 9ᵇ. According to Fig. 6 the supporting ring $d$ is composed of two portions screwed together. Clamped between the said portions is a locking plate $g$ provided at the circumference with one or more teeth or projections $h$ catching in corresponding recesses or between projections formed at the adjacent edges of the race rings $b_1$ and $b_2$. A similar locking may be effected by the race rings $b_1$ and $b_2$ being provided also at the opposite edges with one or more projections engaging corresponding projections formed at the adjacent edges of the race rings $b$ and $b_3$.

As shown in Figs. 9ª and 9ᵇ, one or more plates $g$, $g_1$ are secured to the supporting ring $c$, each of which plates is provided with one or more teeth or projections $h$ and $h_1$ respectively engaging corresponding recesses or projections formed at the adjacent edges of the race rings $b$ and $b_1$. Between the teeth or projections of the locking plates and the recesses or projections of the race rings there must be a sufficient play, so that the turning movements of the latter about the points $e$ and $e_1$ described above can take place.

In all the constructional forms described above the adjustment of a race ring or a supporting ring has, for the sake of simplicity, been considered to be effected by a small turning movement about the point of contact between the race ring and the supporting ring. The adjusting movement is not however a simple but a complicated movement, and, in fact, it constitutes a revolution about a certain point, only if one of the rings at the point of contact is formed as an edge. In all other cases the adjustment is effected by a rolling motion—i. e. a revolution about a contact point different at each moment—and a simultaneous sliding movement. This matter of fact is diagrammatically illustrated in Fig. 11. The race ring $b$ is in section partly formed as a circle passing through the contact point $e_1$, $e_2$ or $e_3$ between the race ring and the supporting ring $c$. The ring $c$ is also in section formed as a circle passing through said contact point but struck with a greater radius. It is supposed that the different parts of the bearing, when unloaded, occupy the positions indicated by dotted lines and index 1, that in this position the outer race member $a$, owing to the existing play is in contact with one ball or ball set only at the point $t_1$, and that the race ring $b_1$ is in contact with the supporting ring at a point $e_1$ not located on the middle line $P_1$ $i_1$ of the section of the race ring nor on the middle-line $m_3$ $e_3$ $o$ of the section of the supporting ring. If now a load be applied to the bearing, the ball-pressure at the point $t_1$ will effect a rolling movement of the race ring along the arc $e_1$ $e_3$ $e_2$. After a moment the parts of the bearing will occupy the positions indicated by stippled lines and index 2. The point $i_1$ of the race ring has moved to the point $i_2$ or $e_2$ on the outline of the supporting ring. This rolling motion is in fact composed of a great number of small rotations about different points of contact between $e_1$ and $e_2$. The contact point between the ball and the outer race ring has moved from $t_1$ to $t_2$. In this position the race ring is acted upon, on the one hand, by a pressure $T_2$ from the ball and, on the other hand, by a reacting pressure $N_2$ from the supporting ring and directed along the radius $e_2$ $o$ of the arc-formed section of said ring. The friction is not taken into consideration until further. The said forces have a resultant R at the point $r$ tending to move, by sliding action, the race ring in such manner, that the point $i_2$ shall move to $i_3$. On account thereof the parts of the bearing will occupy the position shown with full lines and index 3 in Fig. 11. In this position equilibrium will be attained, if the other ball also has come into contact with the outer race ring $a_3$ and thereby has been exposed to the necessary reacting pressure. The friction between the race ring and the supporting ring counteracts, it is true, to a certain extent this sliding movement, so that the points $m_3$, $i_3$ and $o$ will not be positioned on a straight line, but it is to be observed, that the vibrations of the several parts during the work of the bearing always facilitate the sliding movement to said position of equilibrium. The said sliding movement, which in fact can begin, ere the point $i_1$ has arrived to $e_2$, may also be considered as a rotation of the race ring about the point $o$.

An adjusting movement of this kind is the generic occurrence, when both members—the race ring and the supporting ring—are formed, at the contact point between them, as two curves having different radii of curvature. In Fig. 11 the curvature of the curves is so indicated, that the section of the race ring is convex and that of the supporting ring concave. The adjusting movement will be the same, if instead thereof the section of the race ring is concave and that of the supporting ring convex or if a straight line is substituted for one of the curves. As is stated above, a special case will arise, if one of the rings is edged at the contact point, and in this case no sliding movement but a rotation only about the edge will take place. This limit case cannot, however, be realized in practice, since no edge of mathematical sharpness can be produced and far less be used, and owing thereto, even if the contact point is edged, still a combined rolling motion—rotation—and a sliding motion will take place, although the rotating movement is preponderant. Another special case arises, if the sections of both rings have exactly equal radii of curvature (see Fig. 12). In this case no rolling motion will take place and the whole adjusting movement may be considered as a sliding movement or a rotation about the common center $o$. Also this limit case cannot be realized in practice, since the encircling curve always must have a somewhat greater radius than the inner curve, and on account thereof a certain rolling movement will always arise, although the sliding movement in this case is preponderant.

Having thus described my invention what I claim as new and desire to secure by Letters Patent is:—

1. A ball bearing having more than two ball sets and including a bearing member having spherical races for said ball sets struck from a common center on the axis of rotation, and another bearing member comprising at least two race members adjustable in relation to each other and carrying each at most two ball sets.

2. A ball bearing having more than two ball sets and including a bearing member having spherical races for said ball sets struck from a common center on the axis of rotation, and another bearing member, including a number of race members each carrying at most two ball sets, each race member carrying two ball sets being capable of carrying out adjusting movements for adjusting the load on said ball sets.

3. A ball bearing having more than two ball sets and including a bearing member having a spherical race for said ball sets and struck from a center lying on the axis of the bearing, other race members each carrying at most two ball sets, and a member supporting the latter in mutually adjustable relation.

4. A ball bearing having more than two ball sets and including an integral bearing ring having spherical races for said ball sets struck from a common center on the axis of rotation, and another bearing member including a number of race members each carrying at most two ball sets and being capable of carrying out adjusting movements for adjusting the load on said ball sets.

5. A ball bearing having more than two ball sets including a bearing member having spherical races for said balls, another bearing member comprising adjustable race rings each carrying at the most two ball sets, an adjustable ring carrying said race rings, and a support for said latter ring.

6. A ball bearing comprising outer and inner bearing members and an even number of ball sets grouped into pairs, each pair of ball sets being located between an outer spherical race and a grooved inner race-ring, adjustably mounted on a supporting member.

7. A ball bearing comprising outer and inner bearing members and an even number of ball sets grouped into pairs, each pair of ball sets being located between an outer spherical race and a grooved inner race ring, each race ring being automatically adjustable in relation to the spherical race.

8. A ball bearing having more than two ball sets and including a bearing member having a spherical race for said ball sets and struck from a common center on the axis of the bearing, other race members carrying each at the most two ball sets, a support for said race members, and means for preventing a rotation of said race members in relation to the support about the axis of the bearing.

In testimony whereof I have signed my name in presence of two subscribing witnesses.

KARL J. LJUNGBERG.

Witnesses:
JOHN DELMAR,
ELIN WAHMAN.